United States Patent [19]

Grunwald

[11] Patent Number: 4,882,599
[45] Date of Patent: Nov. 21, 1989

[54] OVERHEAD PROJECTOR

[76] Inventor: Peter-Hein Grunwald, Schlatt 215, FL 9491 Ruggell, Liechtenstein

[21] Appl. No.: 174,842

[22] Filed: Mar. 29, 1988

[30] Foreign Application Priority Data

Mar. 31, 1987 [DE] Fed. Rep. of Germany ....... 3710628

[51] Int. Cl.⁴ .............................................. G03B 21/00
[52] U.S. Cl. ...................................... 353/60; 353/122; 353/119; 353/DIG. 5
[58] Field of Search .................. 353/DIG. 5, DIG. 3, 353/98, 99, 60, 61, 122, 120, 119

[56] References Cited

U.S. PATENT DOCUMENTS

| | | | |
|---|---|---|---|
| 2,529,664 | 11/1950 | Roysher | 353/DIG. 3 X |
| 2,944,461 | 7/1960 | Howell | 353/DIG. 3 X |
| 3,250,175 | 5/1966 | Braun | 353/61 |
| 4,294,524 | 10/1981 | Stolov | 353/122 X |
| 4,368,963 | 1/1983 | Stolov | 353/122 X |
| 4,453,810 | 6/1984 | Curiel | 353/55 |
| 4,563,067 | 1/1986 | Ozeki | 353/60 |
| 4,652,101 | 3/1987 | Grunwald | 353/DIG. 5 X |

Primary Examiner—Harry N. Haroian
Attorney, Agent, or Firm—Robert E. Burns; Emmanuel J. Lobato

[57] ABSTRACT

An overhead projector comprises a housing having a top comprising a Fresnel lens and a writing plate overlying the Fresnel lens. A light source in the housing directs light up through the Fresnel lens and writing plate. A support arm projecting up from the rear of the housing supports an objective lens and a deflection mirror in position to project light from the writing plate onto a wall or screen. A liquid crystal indicating or display device overlies the writing plate and is spaced from the writing plate to provide an air flow space between the writing plate and the liquid crystal indicating device. A fan or blower in the projector housing draws air through the air flow space between the liquid crystal indicating device and the writing plate to cool the liquid crystal indicating device and also produces air flow in the projector housing to cool the light source and other components in the housing. The projector may also have a computer and keyboard for controlling the liquid crystal indicating device. In this case, the liquid crystal indicating device is slidable or swingable between a position overlying the writing plate and a position and a position overlying the keyboard.

15 Claims, 9 Drawing Sheets

OVERHEAD PROJECTOR

FIELD OF INVENTION

The invention relates to an overhead projector comprising a housing in which a light source with a condenser and a reflector and a ventilator are arranged and the upper side of which is closed by a Fresnel lens underlying a transparent writing plate as well as a support art mounted on a rear part of the housing and carrying on its free end a projection head comprising an objective lens and a deflection mirror with a liquid crystal indicating device spaced a limited distance above the writing plate and comprising liquid crystals sandwiched between two transparent plates mounted in a frame and provided with electrodes.

BACKGROUND OF THE INVENTION:

Overhead projectors are known in a variety of forms. Recently it has been sought by means of an overhead projector to project on a projection wall a picture of a liquid crystal indicating or display device laid on the writing plate of the overhead projector. This has been quite successful for a short time after the light source of the overhead projector is switched on, but then the picture becomes increasingly worse. It becomes blurred and some parts of the image formed by the liquid crystals disappear. If this experiment is repeated many times it is found that even in the initial stage the image always becomes worse. These disadvantages are attributable to the warming of the liquid crystal indicating device. The warming of the writing plate in the course of the projection leads likewise to the heat absorption in the liquid crystals and the transparent plates which enclose them so that first the arrangement of the liquid crystals is disturbed and scattered and later the liquid crystals lose their property of assuming particular arrangements under the influence of electric fields.

It has been sought to eliminate these disadvantages through an intensive cooling of the liquid crystal indicating device. With these attached ventilators which also blew air through a space between the liquid crystal indicating device and the writing plate a satisfactory reduction of the temperature of the liquid crystal device was not attained. Moreover, the vibration of the ventilators led to unsharpness of the picture.

SUMMARY OF THE INVENTION

The present invention eliminates the disadvantages of the state of the art. It is an object of the invention to assure with simple means that the liquid crystal indicating device remains cool during the projection.

The invention consists therein that, in the housing, devices are arranged which transmit only light with a reduced red and in particular infra red component through the writing plate, that a space between the liquid crystal indicating device and the writing plate is provided on one side, preferably the (front) side opposite the support arm, with a cool air inlet or a cool air entrance device and that the space on another side, preferably the support arm (rear) side, changes over into at least one air channel in which the air stream is drawn by a ventilator arranged in the housing and that the frame enclosing the liquid crystal indicating device arm on at least three sides lies tight on the upper face of the housing of the overhead projector. In this manner, on the one hand, the heating of the liquid crystal indicating device is decreased through reduction of the red and in particulalyr infra red component of the light passing through the writing plate and falling on the liquid crystal indicating device. However, this alone does not eliminate the above mentioned disadvantage. Therefore, by the present invention, the space between the liquid crystal indicating device and the writing plate is cooled by a particular intense and uniform cooling. It is thereby attained that convection heat rising from the writing plate is reliably drawn off. For this cooling there is used the ventilator which is already present in the housing of the overhead projector and which, through its accommodation in the housing of the overhead projector, fulfills all requirements of freedom of vibration, rate of air flow and other requirments. Such ventilators with optimal properties have for many years been available for overhead projectors at relatively low cost. The use of these presently available ventilators leads not only to a simplified construction and a limited cost, but also to the possibility of improving the cooling in the space between the liquid crystal device and the writing plate.

It is advantageous when the ventilator inlet is connected directly with the cool air channel in which the space between the writing plate and the liquid crystal indicating device passes over to the outlet side. The ventilator inlet can here be connected with part of its cross section but it is especially advantageous when the ventilator is connected with its entire cross section so that all of the air moved by the ventilator passes first through the space between the liquid crystal indicating device and the writing plate before the air is utilized for cooling other objects in the interior of the overhead projector housing.

It is particular advantageous when the cool air channel from the space between the liquid crystal indicating device and the writing plate to the ventilator passes through a housing accommodating electronic components and plates which comprise a power supply for the electrodes of the liquid crystal device. These components are thereby cooled by the same cooling air which later is led to the lamp region, as this cooling air is still at a low temperature.

This overhead projector becomes especially simple and economical when the liquid crystal indicating device is formed so that it can be added as an accessory to the overhead projector. For this purpose, it is advantageous when the liquid crystal device to be laid on the upper surface of the overhead projector is formed as an angle component with a housing for accommodating electronic plates arranged at the rear of the housing of the overhead projector. Such a component can be so formed as to be placeable on the upper side of the overhead projector and slideable on the rear side and hereby performs a common function with the ventilator in the interior of the overhead projector housing. Advantageously, on the angle-form member there is arranged a hinge joint which lies in front of the support arm so that it is not necessary to remove the liquid crystal indicating device from the overhead projector when it is desired to work, not with projection of the liquid crystal indicating device, but with a film laid on the writing plate. In this case, the frame with the liquid crystal indicating device is simply swung up and secured to the support arm of the projector head where it is held, for example by a magnet or a pivoted hook.

In an especially favorably structural form, the air outlet opening is arranged in a rear region of the housing and the ventilator is provided with a suction nozzle with which the space between the writing plate and the liquid crystal device is connected.

It is advantageous when the ventilator is formed as a tangential blower which extends over substantially the entire width of the housing and is located in an upper rear part of the housing under the support arm, and slits in the upper surface of the housing on both sides of the support art serve as air channels leading to the ventilator.

If cooling by the room air is insufficient as occurs for example in tropical or sub-tropical areas, it is advantageous when in the region of the air inlet into the space between the writing plate and the liquid crystal indicating device there is provided a cooling device. In this manner, all of the air which serves to cool the liquid crystal indicating device and is drawn through the space between the liquid indicating device and the writing plate is additionally cooled without cooling air for other parts of the overhead projector housing being cooled. It is thereby possible to effect substantial cooling with a small cooling device.

With this kind of additional cooling, it is advantageous when the cooling lamina are Peltier elements or parts of an absorption cooling device of which the heat exchange elements are advantageously arranged in a rear lower region of the housing or outside of the housing on the rear wall of the housing.

The cool air which passes through the space between the liquid crystal indicating device and the writing plate need not be moved directly by the ventilator arranged in the interior of the writing projector housing as it is also possible for the air to be drawn off by suction nozzle which operates on the Venturi principal and is connected with air channels leading from the space between the writing plate and the liquid crystal indicating device.

In an embodiment that has proved especially efficacious, the liquid crystal indicating device is arranged tight on all sides on the upper surface of the writing projector and adjacent the forward upper edge of the projector housing both in the upper surface and also in the front surface there are provided air slits between which cooling lamina are preferably arranged. In order to reduce the red and in particular the infra red rays, it is advantageous when the lamp reflector and the deflection mirror arranged in the interior of the housing are cold light reflectors and when the condenser lens and/or the Fresnel lens and/or a transparent plate arranged between the deflection mirror and the Fresnel lens are coated with red and infra red reflecting layers.

Also through an additional chimmney effect, the air movement in the space between the writing plate and the liquid crystal indicating device is improved. This is achieved by inclining the writing plate as well as the superposed liquid crystal indicating device upwardly from the front to the rear.

The liquid crystal indicating device with its frame can be moved out of the path of light rays passing through the writing plate not only by swinging but also by sliding the liquid crystal indicating device between two positions, namely one in which it overlies the writing plate and a second position in which it is arranged forwardly of the writing plate, advantageously under a cover plate and/or over a keyboard.

This is particularly advantageous when on the front side of the projector a keyboard and/or a computer is arranged.

BRIEF DESCRIPTION OF DRAWINGS

The nature, objects and advantages of the invention will be more fully understood from the accompanying drawings which illustrate schematically several embodiments of the invention and in which.

DESCRIPTION OF PREFERRED EMBODIMENTS

Figure 1:
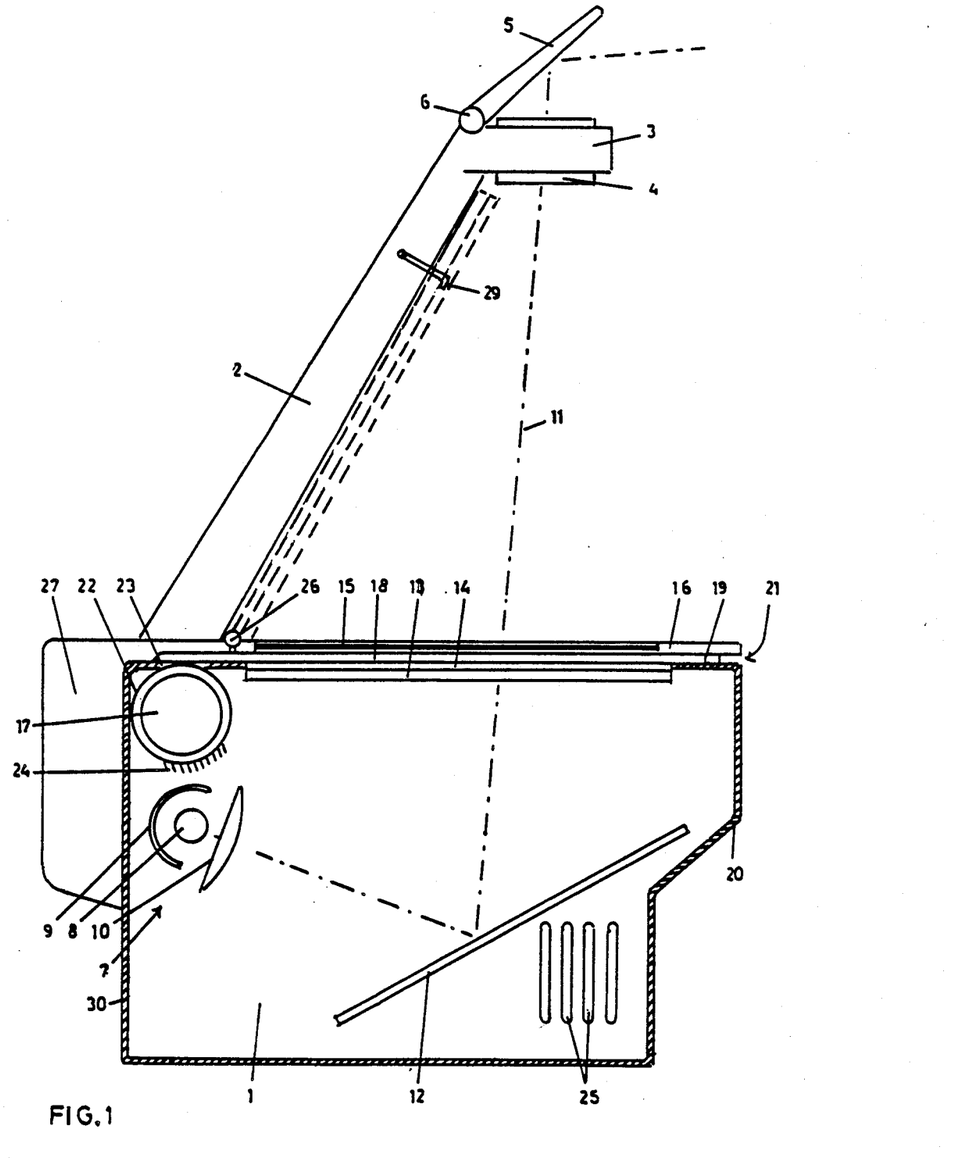
FIG. 1 is a vertical cross section through an overhead projector in which the cool air is drawn out of a space between the liquid crystal indicating device and the writing plate directly through the ventilator of the overhead projector.

FIG. 1 shows an overhead projector comprising a housing 1 on a rear side of which there is mounted a support art 2 which carries a projection head 3 with an objective lens 4 and a deflection mirror 5. This deflection mirror is mounted on the support arm 2 by a hinged joint 6.

In the interior of the housing 1 there is a light source 7 which comprises a lamp 8, a reflector 9 and a condenser 10. The light rays 11 from the light source flow to a deflection mirror 12 mounted in the interior of the housing then through a Fresnel lens 13 and the writing plate 14 and then through the liquid crystal indicating or display device 15 comprising two transparent plates provided with electrodes between which liquid crystals are enclosed. This liquid crystal indicating device 15 is held in a frame 16. The light rays 11 then flow further through the objective lens 4 to the deflection mirror 5 of the projection head and from there to a projection wall or screen (not shown).

In the interior of the housing of the overhead projector there is arranged a ventilator 17 which, in usual manner, is used for cooling the light source 7 and also other parts in the interior of the housing of the overhead projector.

In accordance with the invention, this ventilator 17 is also used for cooling a space 18 between the liquid crystal indicating device 15 and the writing plate 14. In order to make this possible, spacing and sealing strips 19 are provided at both sides under the frame 16. However, there is no sealing strip on the front side 20. Rather, here is found the air inlet 21. The ventilator 17 is arranged in an upper rear part of the housing 1. In the ventilator housing 22 there are air inlet openings 23 which are connected directly with the space 18 between the writing plate and the liquid crystal indicating device. Through this arrangement, all of the air that the ventilator 17 directs through the outlet openings 24 to cool the light source 7 is drawn out of the space 18 between the writing plate 14 and the liquid crystal indicating device 15. As the ventilator is a tangential blower which extends substantially the entire width of the housing land as the air inlet openings 23 extend over substantially the whole width of the housing, a very uniform air stream is drawn through the space 18. This achieves a very intensive evacuation of heat from this space. The cooling air blown into the housing 1 through the outlet openings 24 of the blower housing 22 is discharged through outlet openings 25 arranged in the sides of the housing 1.

The frame 16 of the liquid crystal indicating device 15 is connected by means of a hinged joint 26 with the circuit housing 27 which is formed as an angular structural part. In this circuit housing 27 there are circuit boards with electronic components which convert electrical signals from a computer into signals which drive the liquid crystal indicating device. The circuit housing 27 is suitably secured on the upper face of the projector housing 1 for example by screws. The support arm 2 can be secured either on the upper face of the circuit housing 27 or on the upper face of the projector housing 1. In the latter case the circuit housing 27 is provided with a central slot or is formed in two parts, one on either side of the support arm 2.

The hinged joint 26 is arranged in front of the support arm 2 so that the frame 16 of the liquid crystal indicating device can be swung up out of the path of the light rays 11, as is shown in broken lines in FIG. 1. A pivoted hook 29 can serve to secure the frame 16 in its upper position. Alternatively, a magnet can be provided on the support arm 2 for holding the frame 16 in its upper position.

Figure 2:
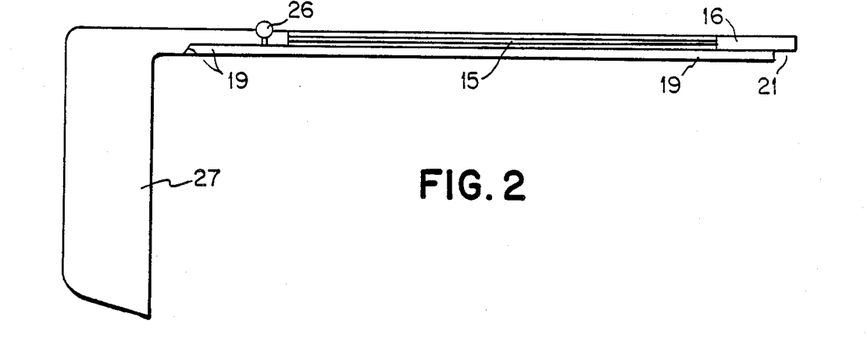
FIG. 2 is a side elevation of the liquid crystal indicating device removed from the overhead projector.
Figure 3:
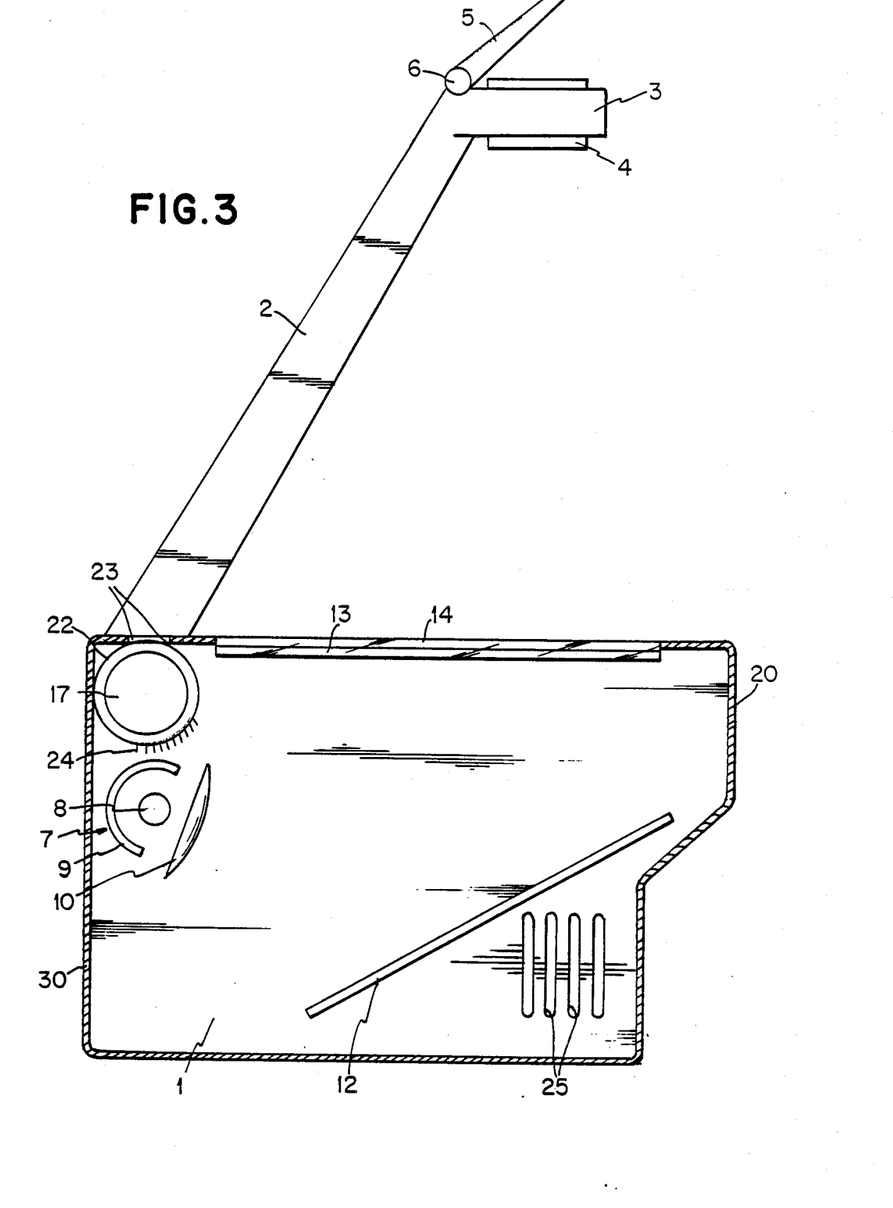
FIG. 3 is a vertical section of the overhead projector with the liquid crystal indicating device removed.

In FIGS. 2 and 3 the projector is shown in vertical section without the liquid crystal indicating device and the liquid crystal indicating device together with the circuit housing 27 is shown separately in side elevation. It will be seen that these components can be brought together without any fastening to one another when the hinge joint 26 is so arranged that it engages the front side of the support arm 2. To mount the liquid crystal device on the projector the two-part circuit housing is swung up, the frame 16 is placed on the upper surface of the projector housing and slid back until the hinge 26 engages the front wall of the support arm 2 and the two-part circuit housing 27 is then swung rearwardly and downwardly to a position in which it engages the rear wall of the housing 1.

Figure 4:
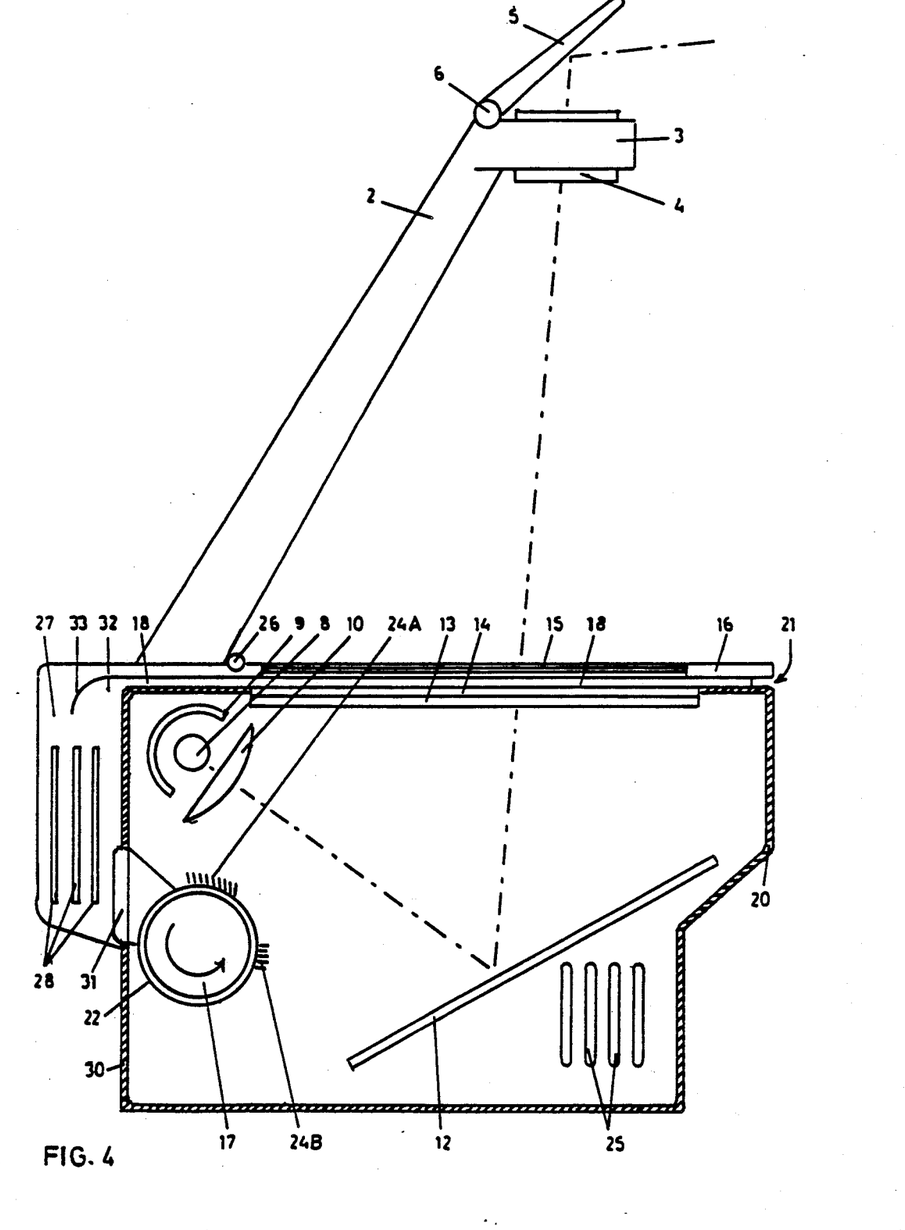
FIG. 4 is a vertical section through an overhead projector with a liquid crystal indicating device in which the cool air is first drawn through the space between the liquid crystal indicating device and the writing plate and then through a housing for electrical components of a power supply for the liquid crystal indicating device.

The overhead projector shown in FIG. 4 is of similar construction but the light source 7 is located in an upper rear portion of the housing while the ventilator 17 is adjacent the rear wall of the housing and approximately midway between the top and the bottom. The ventilator 17 drawns air through air inlet slits 3 in the rear wall of the housing. Whenthe fluid crystal indicating device comprising the frame 16 and circuit housing 27 is mounted on the projector housing the circuit housing 27 covers the air inlet slits 31 in the rear wall of the housing 1 so that the ventilator 17 draws all of its air out of the circuit housing 27. The space 18 between the liquid crystal indicating device and the writing plate in this embodiment extends rearwardly so that it connects with the interior of the circuit housing 27 at position 32 so that the air drawn by the ventilator 17 is drawn through the space 18 and then through the circuit housing 27 with circuit boards 28 and is discharged from the ventilator 17 through outlet openings 24A and 24B which are directed respectively toward the light source 7 and the deflection mirror 12. A baffle 3 directs the air downwardly over the circuit boards 28.

Figure 5:
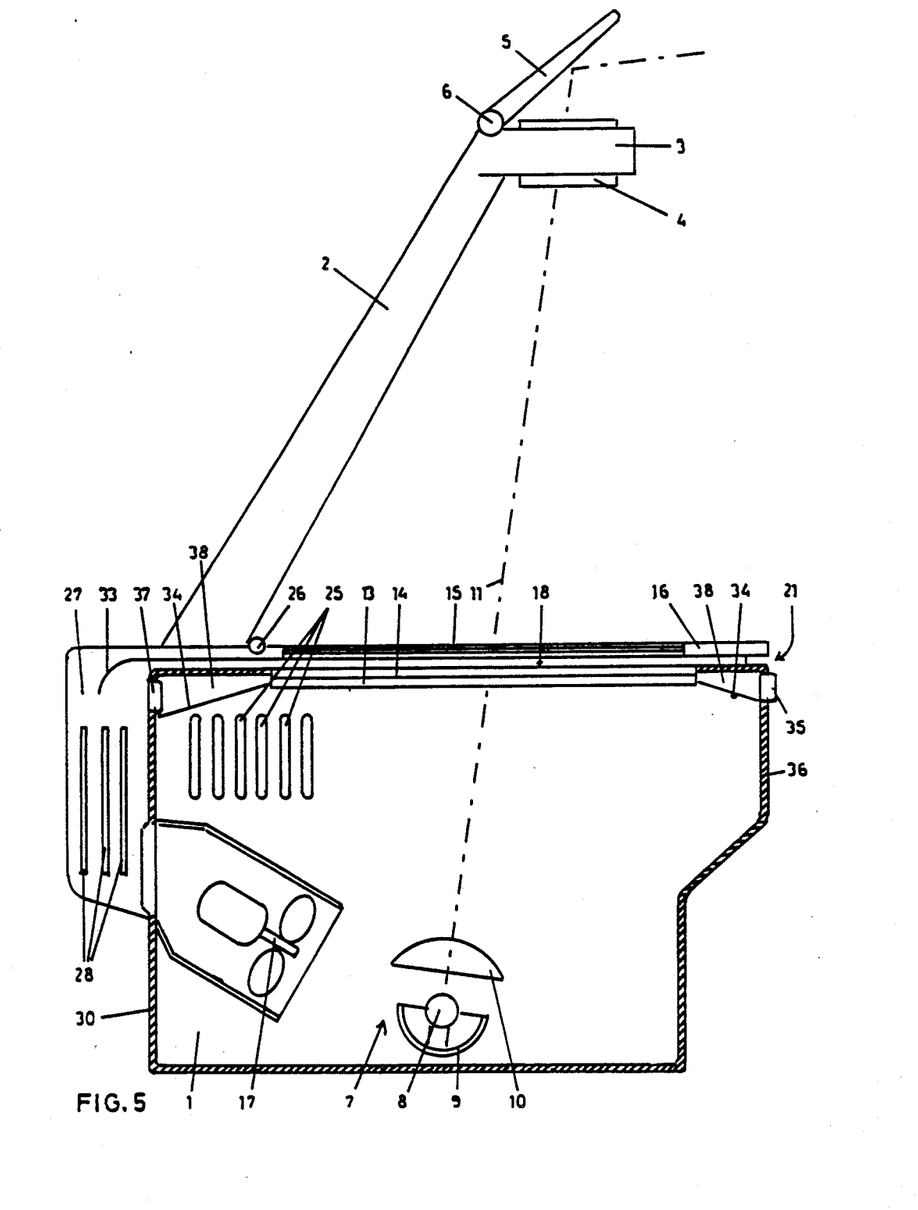
FIG. 5 is a vertical section through another embodiment of the invention with similar cool air circulation.

In the embodiment of FIG. 5, air is drawn through the space 18 and the circuit housing 27 in like manner but the ventilator is an axial blower 17 instead of a tangential blower. Now the blower directs the air toward the light source 7 which is located in a lower central portion of the housing and comprises a lamp 8 and a reflector 9 which directs the light upwardly through a lens 10 to the underside of the Fresnel lens 13. Through arrangement of an isolating plate 34 which surrounds the Fresnel lens 13 on all sides and is connected fast with the walls of the housing 1 as well as through the arrangement of air inlet openings 35 in the front wall 36 and outlet openings 37 in the rear wall 30, there is formed a second air channel 38 similar to the space 18 and parallel thereto between the Fresnel lens 13 and the writing plate 14 so that the writing plate 14 is also cooled from below. Through the outlet openings 37 in the rear wall, the air which is drawn through this channel 38 likewise enters the circuit housing 27 from which it is drawn by the ventilator 17.

FIGS. 6 to 9 disclose a projector of similar construction in which the light source 7 and other parts in the housing 1 are cooled by a ventilator 17 which also moves air through the space 18 between the writing plate and the liquid crystal device. However, there are essential differences in construction.

Figure 6:
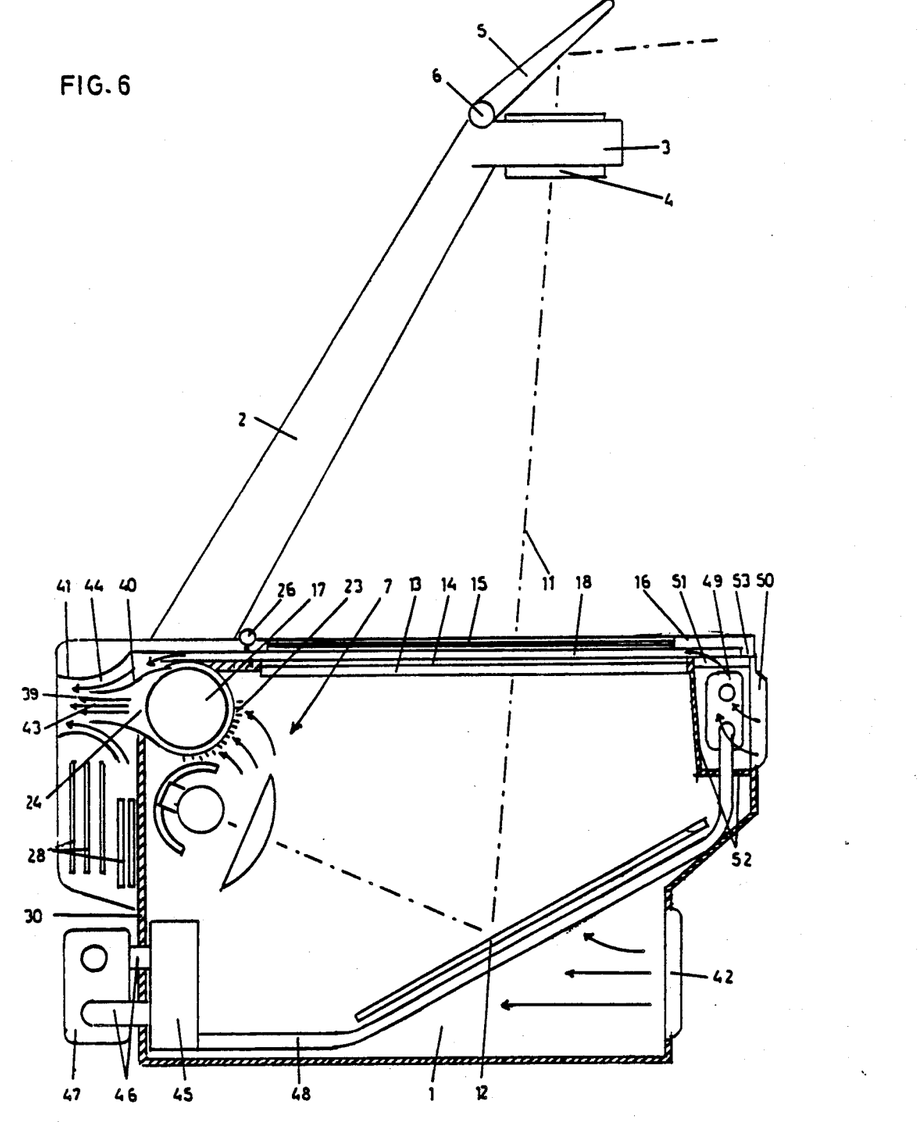
FIG. 6 is a vertical section through a projector provided with additional cooling by an absorption cooling unit.
Figure 7:
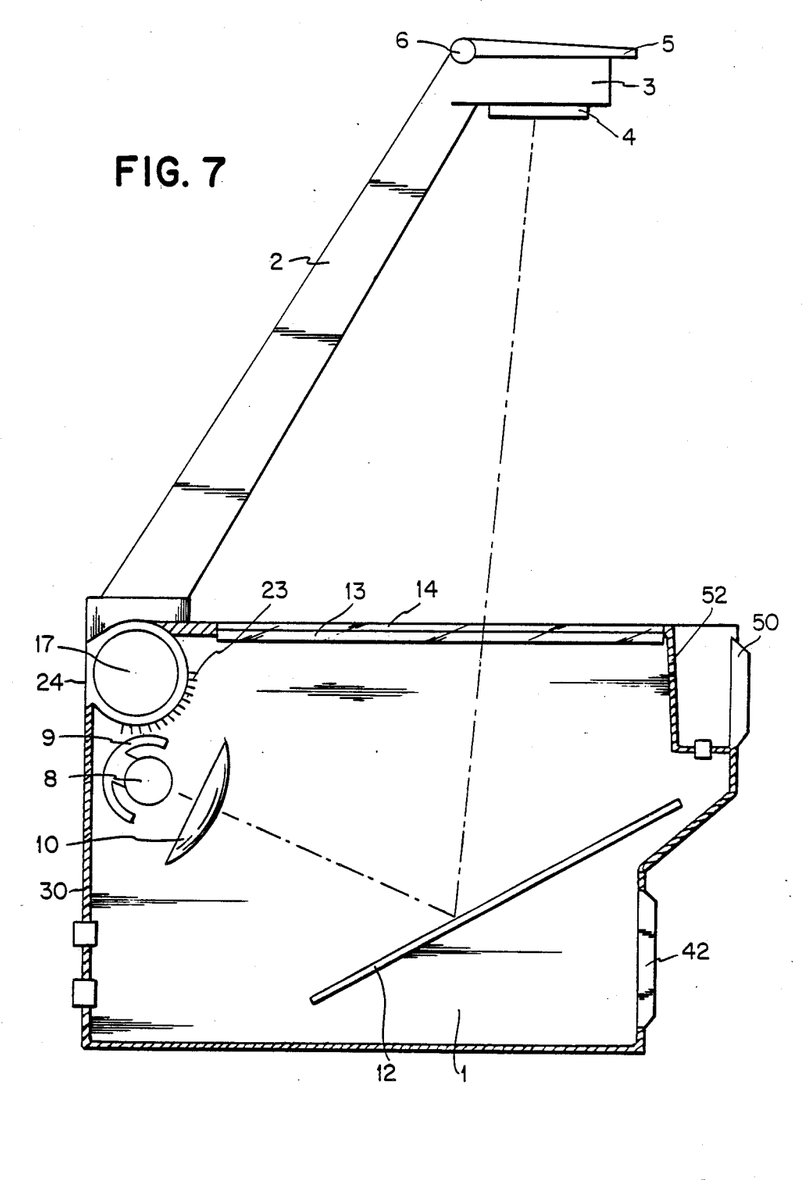
FIG. 7 is a vertical section through the projector of FIG. 6 without the liquid crystal indicating device and without the cooling unit.
Figures 8, 9:
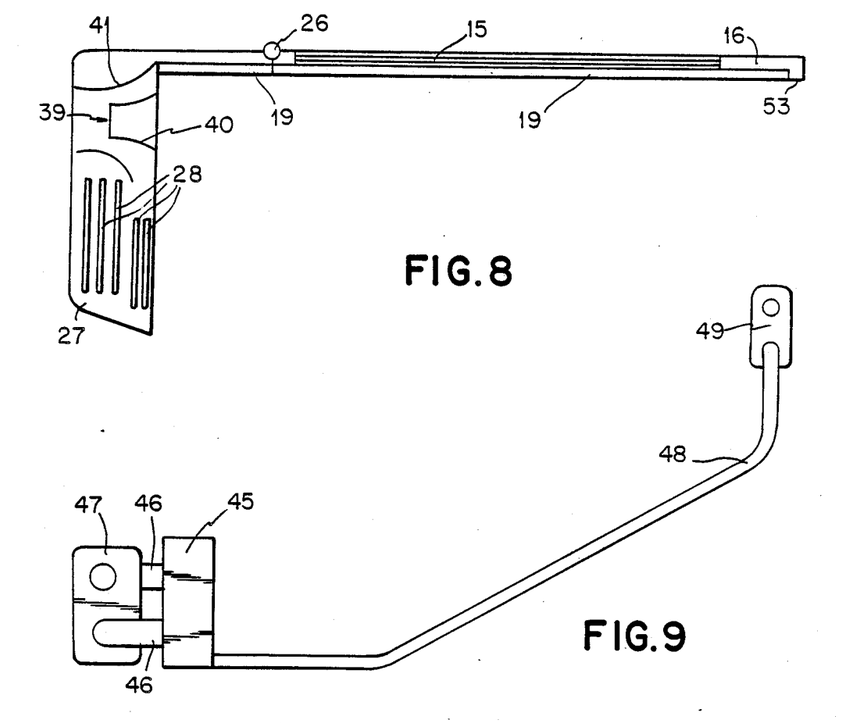
FIG. 8 is a side elevation of the liquid crystal indicating device.
FIG. 9 is a schematic side elevation of the cooling unit.

The outlet of the ventilator 17, mounted on the rear wall of the housing 1, is directed rearwardly through the circuit housing 27. In the circuit housing above the circuit boards 28 there is arranged a suction nozzle 39 which comprises two tubes 40 and 41 arranged one inside the other so as to form a Venturi tube. Through the inner tube 30, the outlet of which forms a wide slot which extends over substantially the entire width of the housing 1 of the overhead projector, air from the ventilator 17 is discharged, such air having served to cool the light source 7 and other components in the housing 1 and which is admitted to the housing 1 through air inlet openings 42. Through this air stream 43 air is drawn through channel 44 between the inner and outer tubes from the space 18 between the liquid crystal device 15 and the writing plate 14. A further air stream is drawn through the circuit housing 27 in which the circuit boards 28 are mounted. If the liquid crystal device 15 with its frame 16 and the circuit housing 27 are not on the projector, the air from the ventilator 17 is discharged through the outlet opening 24 into the atmosphere.

Moreover, the embodiment shown in FIG. 6 has an additional cooling device and indeed an absorption cooling device. The absorber is in a container 45 which is located in the projector housing 1 and is connected by tubes 46 with a heat exchanger 47 located outside a rear wall of the housing. The absorber is connected by tubes 48 with a cooling unit 49 located in a compartment formed by partitions 52 in an upper forward part of the projector housing 1 and provided with air inlet openings 50 in the front wall of the housing and an outlet opening 51 which opens into the space 18 between the writing plate and the liquid crystal device. The partitions 52 separate the compartment in which the cooling device 49 is located from the interior housing 1. A sealing strip 53 is provided under the front edge of the frame 16 so that the air flow into the space 18 is only through the outlet opening 51 of the compartment in which the cooling unit 49 is located. This cooling of the inlet air into the space 18 is especially advantageous when the projector must be used in a warm room.

Figure 10:
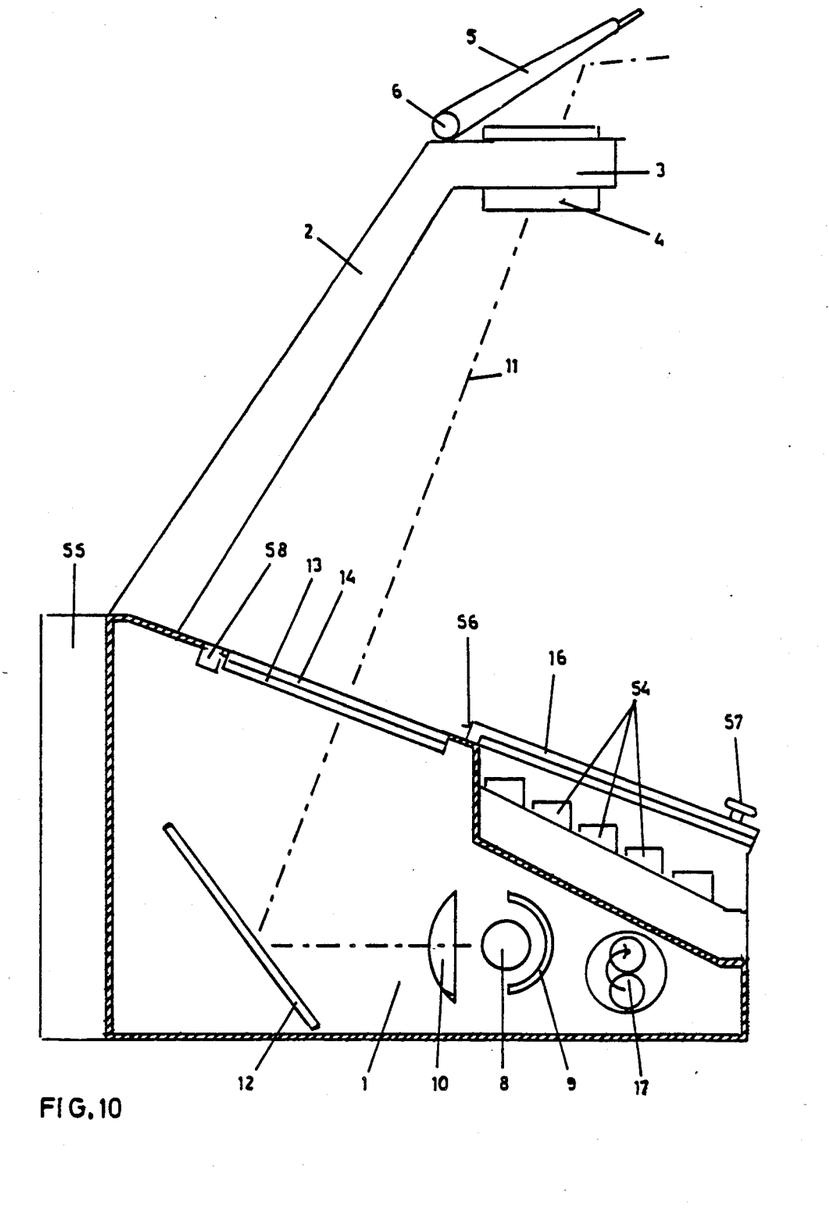
FIG. 10 is a vertical section of a projector with a liquid crystal indicating device and keyboard in which the liquid crystal indicating device is slideable between a position in which it overlies the writing plate and a position in which it is shown overlying the keyboard.
Figure 11:
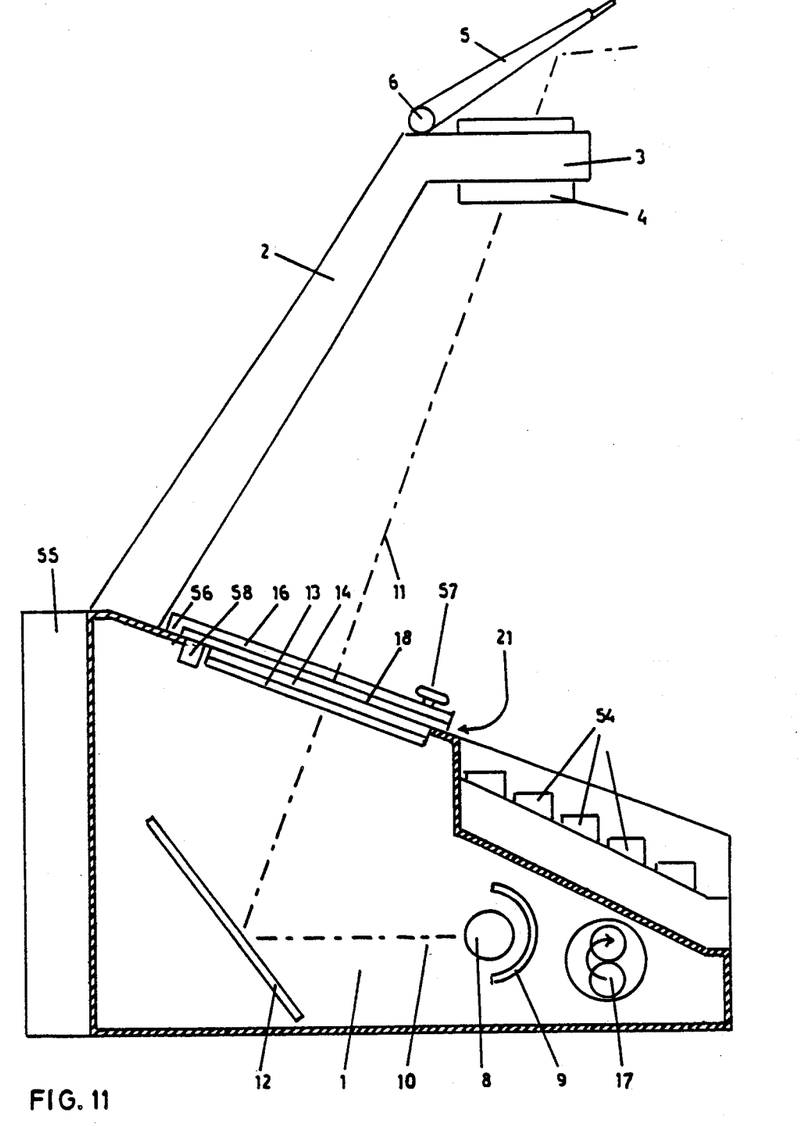
FIG. 11 is a vertical section of the overhead projector of FIG. 10 in which the liquid crystal device is shown in a position overlying the writing plate.

In the overhead projector of FIGS. 10 and 11, the writing plate 14 is inclined upwardly and rearwardly and the keyboard 54 is arranged in front of the writing plate 14. The inclination of the writing plate and liquid crystal indicating device provides a chimney effect in the space between them. The keyboard 54 serves to actuate a computer 55 which is arranged on the rear wall 30 of the housing. The computer 55 is connected by electrical cables with the liquid crystal indicating device 15. This liquid crystal indicating device is slideable in suitable guides between the position shown in FIG. 10 in which the frame 16 and the liquid crystal device 15 overlie the keyboard 54, leaving the writing plate free for projection of a film or other overlay, and the position shown in FIG. 11 in which the liquid crystal indicating device overlies the writing plate 14 for projection of an image formed by the liquid crystal indicating device. In spite of the inclined arrangement of the writing plate 14, films or other overlays do not slide down off of the writing plate as they are supported by a down-turned rim 56 of the frame 16. This rear frame part 56 is turned downwardly and serves likewise as a sealing strip.

If the liquid crystal sealing device is to be illuminated and projected, the frame 16 is slid upwardly as shown in FIG. 11 and is secured in place by a locking device 57.

In a side wall in a forward region of the housing there is arranged an axial blower 17 which draws air out of the interior of the housing and discharges it into the atmosphere. The otherwise air tight housing has in an upper wall behind the writing plate 14, air inlet openings 58 through which air is drawn into the housing by the ventilator 17. If the frame 16 with the liquid crystal indicating device 15 is in its lower position over the keyboard 54 (FIG. 10) air enters the air inlet slots 58 from the atmosphere. If on the contrary the frame 16 with the liquid crystal device 15 is in the upper position as shown in FIG. 11 the ventilator 17 draws air through the space 18 between the writing plate 14 and the liquid crystal device and through the air inlet slits 58 into the interior of the projector housing 1, whereby the air enters the space 18 at the forward end of the frame 16 through air inlet 21 where no sealing strip is provided. Sealing strips are being provided only at the sides of the frame 16 the downturned rear edge 56 of the frame 16 is in sealing contact with the upper surface of the housing 1 so that air is drawn into the space 18 only at the front edge of the frame 16.

Figure 12:
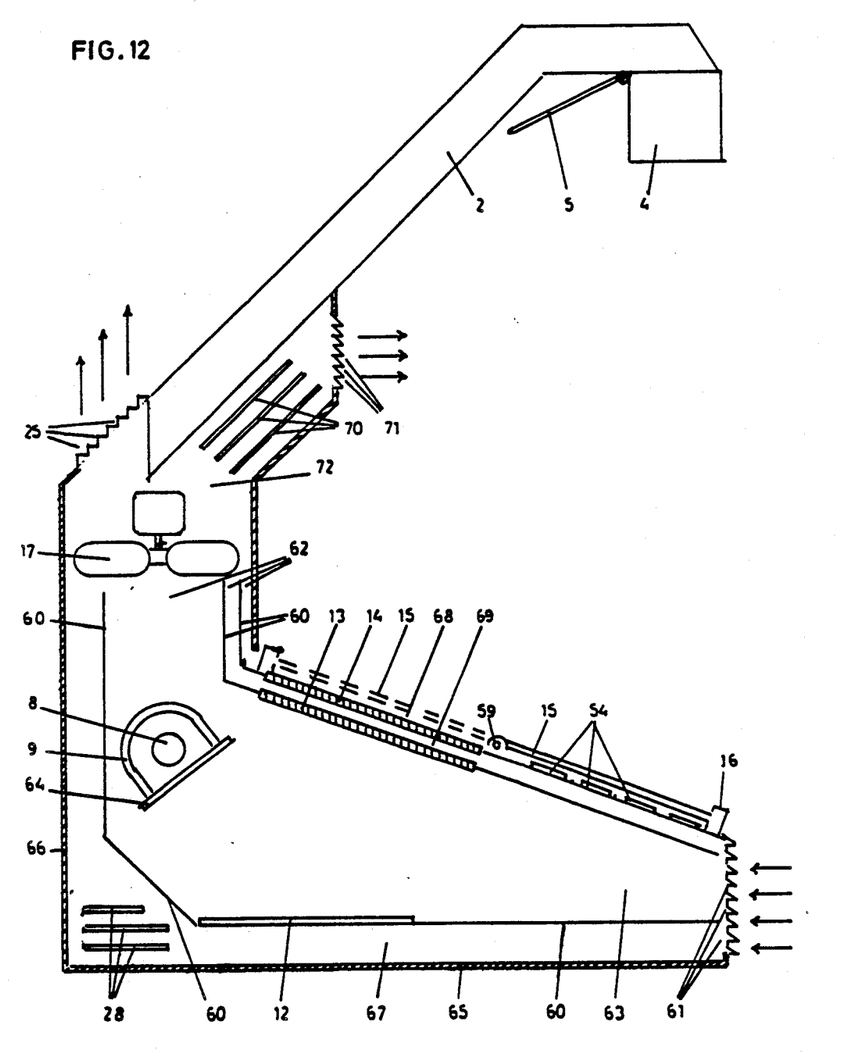
FIG. 12 is a vertical section of an overhead projector in which a liquid crystal indicating device is hinged for movement between a position, shown in broken lines, in which it overlies the writing plate and a position, shown in solid lines, in which overlies a keyboard.

FIG. 12 is a vertical section of another embodiment of a projector in accordance with the invention. This projector also has a keyboard 54. The liquid crystal indicating device 15 with its frame 16 is mounted by a pivot shaft 59 located above the keyboard 54 and below the writing plate 14 and can thereby be swung from a position over the keyboard 54 as shown in solid lines in FIG. 12 to another position over the writing plate 14 as shown in broken lines according to whether an image of the liquid crystal indicating device is to be projected whereby at the same time the keyboard 54 is open for use or whether a film or other overlay is to be illuminated and projected. In this embodiment the ventilator 17 is located in an upper rear region of the housing just below the support arm 2 and draws air out of the housing The housing 1 is divided by a partition 60 into a plurality of air channels extending from the air inlet openings 61 in the front of the housing to air outlet openings 62 above the ventilator 17. In an air channel 63 formed in this manner is located a lamp 8, a cold light reflector 9 and a heat reflecting filter 64. In an air channel 67, which is first parallel to the bottom 65 and then parallel to the back wall 66, are located plates 28 on which electronic components are arranged. An air channel 68 lies between the writing plate 14 and the liquid crystal indicating device 16 while an air channel 69 lies between the Fresnel lens 13 and the writing plate 14. With this arrangement of different air channels the liquid crystal indicating device is subjected to only very limited warming, in particular since the reflector 9 as well as the deflection mirror 12 in the housing are cold light reflecting, the red and infra red rays passing through them. In the case of the deflection mirror 12 the red and infra red rays passing through the mirror go into the air channel 67 and strike the housing bottom 65 from which the heat produced is drawn off by the air stream in the channel 67. Air outlet openings 25 are located above the ventilator 17 but only a part of the air from the ventilator is discharged through the outlet openings 25 into the atmosphere. Another part is directed into the support arm 2 in which further electronic components 70 are located. These components are cooled by the air stream which finally is discharged from the support arm through air outlet openings 71.

The overhead projector in accordance with the invention can also be provided with two ventilators. The ventilator or ventilators can thereby be so arranged that the cool air is drawn passed components to be cooled and finally is blown past other components to be cooled.

The direction of air flow in the different embodiments of the invention that have been illustrated can also be in the opposite direction.

It is particularly advantageous when an internal focusing objective is used as in the embodiment of FIG. 12 whereby an especially good projection is achieved with a fixed lamp position.

The lamp is advantageously a cold light lamp in particular a cold light internal reflector lamp, and can then be used without a condenser. The liquid crystal device (LCD) can be of different sizes. For example, in the embodiments of FIGS. 11 and 12 sizes of 6 cm×6 cm, 6 cm×9 cm and 9 cm×12 cm are particularly advantageous.

What I claim is:

1. An overhead projector comprising:
a housing having side walls, a bottom and a top comprising a Fresnel lens and a transparent writing plate overlying said Fresnel lens,
a light source in said housing and means in said housing for directing light from said light source up through said Fresnel lens and writing plate,
a support arm projecting up from one side of said housing and having an upper end overlying said writing plate,
an objective lens and deflection mirror mounted on said upper end of said support arm for projecting light from said writing plate onto a wall or screen,
a liquid crystal indicating device overlying said writing plate and comprising a frame, two transparent plates set in said frame with a space between them and provided on inner surfaces with electrodes and liquid crystals sandwiched between said plates, said liquid crystal lighting device being spaced over said writing plate to provide between said writing plate and said liquid crystal indicating device on air flow space having an air inlet at one side of said liquid crystal indicating device and an air outlet at an opposite side of said liquid crystal indicating device,
ventilation means in said housing for producing air flow over said light source and light directing means to cool them, said ventilator means also producing air flow through said air flow space between said writing plate and said liquid crystal indicating device from said air inlet to said air outlet to cool said liquid crystal indicating device, and
a housing for electronic elements, said electronic element housing being L-shaped with an upper portion on top of said projector housing and a rear part at the rear of said projector housing, said liquid crystal indicating device being connected by a hinge joint with said upper part of said electronic element housing.

2. An overhead projector according to claim 1, in which said air outlet of said space between said liquid crystal indicating device and said writing plate is connected with the interior of said electronic element housing and the interior of said electronic element housing is connected with an air inlet of said ventilator means to provide a path of air flow from said space between said crystal indicating device and said writing plate, through the interior of said electronic element housing to said ventilator means.

3. An overhead projector according to claim 1, in which said support arm extends up from a rear side of said projector housing and in which said electronic element housing comprises two parts, one on either side of said support arm, said hinge joint between said liquid crystal indicating device and said electronic element housing being disposed just in front of said support arm to permit said liquid crystal indicating device to be swung between a position overlying the writing plate and a position in front of said support arm.

4. An overhead projector according to claim 3, further comprising means on said support arm for holding said liquid crystal indicating device in said position in front of said support arm.

5. An overhead projector according to claim 1, in which said ventilator means has discharge means comprising a Venturi having a suction inlet, said suction inlet of said Venturi being connected with said air outlet of said space between said liquid crystal indicating device and said writing plate and with the interior of said electronic element housing.

6. An overhead projector comprising
a housing having side walls, a bottom and a top comprising a Fresnel lens and a transparent writing plate overlying said Fresnel lens,
a light source in said housing and means in said housing for direction light from said light source up through said Fresnel lens and writing plate,
a support arm projecting up from one side of said housing and having an upper end overlying said writing plate,
an objective lens and deflection mirror mounted on said upper end of said support arm for projection light from said writing plate onto a wall or screen,
a liquid crystal indicating device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and
ventilation means in said housing for producing air flow over said light source and light directing means to cool them, said ventilator means also producing air flow through said air flow space between said writing plate and said liquid crystal indicating device from said air inlet to said air outlet to cool said liquid crystal indicating device,
air cooling means disposed upstream of said space between said liquid crystal indicating device and said writing plate for cooling air entering said air inlet of said space,
said air cooling means comprising absorber means in said projector housing, heat exchange means connected with said absorber means and disposed outside said projector housing and a cooling unit connected with said absorber means and disposed upstream of said air inlet of said space between said liquid crystal indicating device and said writing place.

7. An overhead projector comprising
a housing having side walls, a bottom and a top comprising a Fresnel lens and a transparent writing plate overlying said Fresnel lens,
a light source in said housing and means in said housing for directing light from said light source up through said Fresnel lens and writing plate,
a support arm projecting up from one side of said housing and having an upper end overlying said writing plate,
an objective lens and deflection mirror mounted on said upper end of said support arm for projecting light from said writing plate onto a wall or screen,
a liquid crystal indicating device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and ventilation means in said housing for producing air flow over said light source and light directing means to cool them, said ventilator means also producing air flow through said air flow space between said writing plate and said liquid crystal indicating device from said air inlet to said air outlet to cool said liquid crystal indicating device, said support arm projecting up from a rear side of said projector housing and said Fresnel lens, writing plate and liquid crystal indicating device being inclined upwardly from the front of said projector housing toward said support arm, and a keyboard located forwardly of said writing plate, said liquid crystal indicating device being slidable between a position in which it overlies said writing plate and a position in which it overlies said keyboard.

8. An overhead projector according to claim 7, in which said ventilator means comprises an exhaust blower located in a lower forward region of said projector housing and in which an opening in said housing above said writing plate is in position to communicate with said space between said liquid crystal indicating device and said writing plate when said liquid crystal indicating device is in a position overlying said writing plate to draw air through said space, said opening being open to the atmosphere when said liquid crystal indicating device is in a position overlying said keyboard.

9. An overhead projector comprising
a housing having side walls, a bottom and a top comprising a Fresnel lens and a transparent writing plate overlying said Fresnel lens,
a light source in said housing and means in said housing for directing light from said light source up through said Fresnel lens and writing plate,
a support arm projecting up from one side of said housing and having an upper end overlying said writing plate,
an objective lens and deflection mirror mounted on said upper end of said support arm for projecting light from said writing plate onto a wall or screen,
a liquid crystal indicating device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and
ventilation means in said housing for producing air flow over said light source and light directing means to cool them, said ventilator mean also producing air flow through said air flow space between said writing plate and said liquid crystal indicating device from said air inlet to said air outlet to cool said liquid crystal indicating device,
said support arm projecting up from a rear side of said projector housing and said Fresnel lens, writing plate and liquid crystal indicating device being inclined upwardly from the front of said projector housing toward said support arm, and a keyboard located forwardly of said writing plate, said liquid crystal indicating device being swingable about a hinge joint between a position in which it overlies said writing plate and a position in which it overlies said keyboard.

10. An overhead projector comprising,
a housing having side walls, a bottom and a top comprising a Fresnel lens and a transparent writing plate overlying said Fresnel lens,
a light source in said housing and means in said housing for directing light from said light source up through said Fresnel lens and writing plate,
a support arm and projecting up from one side of said housing and having an upper end overlying said writing plate,
an objective lens and deflection mirror mounted on said upper end of said support arm for projecting light from said writing plate onto a wall or screen,
a liquid crystal indicating device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and
ventilation means in said housing for producing air flow over said light source and light directing means to cool them, said ventilator means also producing air flow through said air flow space between said writing plate and said liquid crystal indicating device from said air inlet to said air outlet to cool said liquid crystal indicating device,
said support arm projecting up from a rear side of said projector housing and said Fresnel lens, writing plate and liquid crystal indicating device being inclined upwardly from the front of said projector housing toward said support arm, and said ventilator means being located in an upper rear region of said projector housing under said support arm in position to draw air up through said space between said liquid crystal indicating device and said writing place and to draw air into said projector housing through air inlet openings in a forward lower part of said projector housing, air from said ventilator means being discharged through outlet openings located above said ventilator means.

11. An overhead projection or according to claim 10, further comprising an electronic element housing located above said ventilator means and having air outlet openings, a part of the air discharged by said ventilator means passing through said electronic element housing and being discharged through said outlet openings of said electronic element housing.

12. An overhead projector according to claim 10, in which the interior of said projector housing between said air inlet openings and said ventilator means is divided by a partition into a plurality of air flow channels, said light directing means comprising a cold light reflecting mirror set in said partition, said mirror permitting red and infrared rays to pass through it.

13. An overhead projector comprising a housing having side walls, a bottom and a top comprising a Fresnel lens and a transparent writing plate overlying said Fresnel lens, a light source in said housing and means in said housing for directing light from said light source up through said Fresnel lens and writing plate, a support arm projecting up from one side of said housing and having an upper end overlying said writing plate, an objective lens and deflection mirror mounted on said upper end of said support arm for projecting light from said writing plate onto a wall or screen, a liquid crystal indicating device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and ventilation means in said housing for producing air flow over said light source and light directing means to cool them, said ventilator means also producing air flow through said air flow space between said writing plate and said liquid crystal indicating device from said air inlet to said air outlet to cool said liquid crystal indicating device, said writing plate being spaced from said Fresnel lens to provide a second air flow space between said writing plate and said Fresnel lens, said ventilator means also providing air flow through said second air flow channel, said support arm extending up from a rear side portion of said projector housing and an electronic element housing being disposed on a rear side of said projector housing in communication with said air flow space between said liquid crystal indicating device and said writing plate and with said air flow space between said writing plate and said Fresnel lens, said ventilator means having an air inlet in communication with the interior of said electronic element housing and an air outlet discharging air into the interior of said projector housing.

14. An overhead projector comprising a housing having side walls, a bottom and a top comprising a Fresnel lens and a transparent writing plate overlying said Fresnel lens, a light source in said housing and means in said housing for directing light from said light source up through said Fresnel lens and writing plate, a support arm projecting up from one side of said housing and having an upper end overlying said writing plate, an objective lens and deflection mirror mounted on said upper end of said support arm for projecting light from said writing plate onto a wall or screen, a liquid crystal indicative device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and ventilation means in said housing for producing air flow from said light source and light directing means to cool them, said ventilator means also producing air flow through said air flow space between said writing plate and said liquid crystal indicating device from said air inlet to said air outlet to cool said liquid crystal indicating device, a computer and a keyboard controlling said liquid crystal indicating device, said keyboard being disposed forwardly of said writing plate and said liquid crystal indicating device being movable between a position overlying said writing plate and a position overlying said keyboard, leaving said writing plate free to receive an overlay for projection.

15. An overhead projector comprising a housing having side walls, a bottom and a top comprising a Fresnel lens and a transparent writing plate overlying said Fresnel lens, a light source in said housing and means in said housing for directing light from said light source up through said Fresnel lens and writing plate, a support arm projecting up from one side of said housing and having an upper end overlying said writing plate, an objective lens and deflection mirror mounted on said upper end of said support arm for projecting light from said writing plate onto a wall or screen, a liquid crystal indicating device overlying said writing plate and comprising a frame, two transparent plates set in said frame with a space between them and provided on inner surfaces with electrodes and liquid crystals sandwiched between said plates, said liquid crystal indicating device being spaced over said writing plate to provide between said writing plate and said liquid crystal indicating device an air flow space having an air inlet at one side of said liquid crystal indicating device and an air outlet at an opposite side of said liquid crystal indicating device, and ventilation means in said housing for producing air flow over said light source and light directing means to cool them, said ventilator means also producing air flow through said air flow space between said writing plate and said liquid crystal indicating device from said air inlet to said air outlet to cool said liquid crystal indicating device, said ventilator means comprising a tangential blower located in an upper rear region of said housing and extending substantially the full width of said housing, said tangential blower having an inlet connected with said air outlet of said air flow space between said liquid crystal indicating device and said writing plate.

* * * * *